March 20, 1962 U. RAYDT ETAL 3,025,946
PRODUCTION OF ELECTRIC CABLE SHEATHS
Filed Dec. 12, 1958
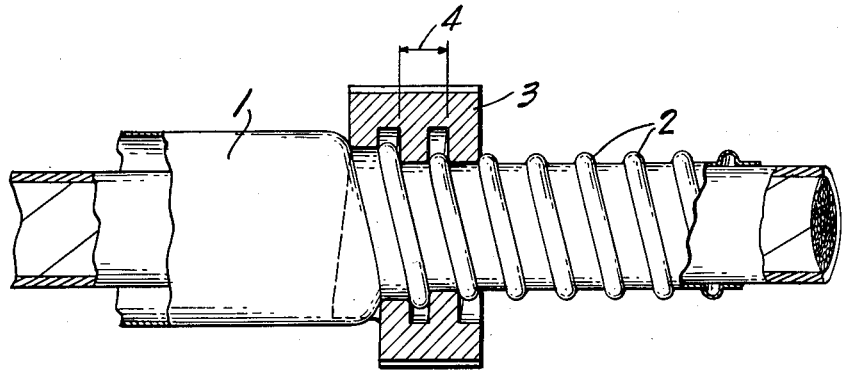
FIG-1-
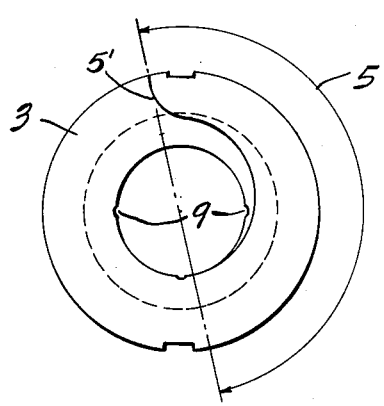
FIG-2-
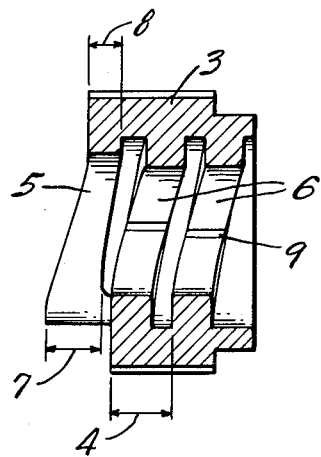
FIG-3-

United States Patent Office 3,025,946
Patented Mar. 20, 1962

3,025,946
PRODUCTION OF ELECTRIC CABLE SHEATHS
Ulrich Raydt, 13 Ziegelstrasse, Osnabruck, Germany, and Karl Heinz Hahne, 12 Hauffstrasse, Korntal, Kreis Leonberg, Germany
Filed Dec. 12, 1958, Ser. No. 780,152
3 Claims. (Cl. 205—26)

Electric cables sheathed with aluminum alloy or other metal having a higher melting point than lead frequently have the sheath profiled to a corrugated or bellows shape, so that the sheathed cable is adequately flexible. The corrugated or bellows profile usually runs helically around the longitudinal axis of the cable. In the case of the corrugated profile it may correspond in longitudinal section to a sinusoidal curve, but in the case of the bellows profile, it possesses alternately an outwardly domed or semicircular section and an adjacent cylindrical part which rests on the cable core, as described in our United States Patent No. 2,852,597. The ratio of the widths of these two parts in the direction of the longitudinal axis of the cable should correspond to an optimum value if the cable sheath is to be as flexible as possible.

Such a cable sheath can be produced from a smooth cylindrical tube, into which the cable core is drawn, before the tube or sheath is deformed to impart the corrugated or bellows profile. As will be understood, the internal diameter of the smooth sheath must be clearly larger than the external diameter of the cable core, so that the cable core can be drawn into the tube before deformation, otherwise the friction of the cable core in drawing it through the smooth tube would become too great.

On the other hand, in the production of these cable sheaths, it is also possible to extrude a smooth, cylindrical tube over and around the cable core. As will be understood, the tube here again must have a greater internal diameter than the external diameter of the cable core, since a cooling or heat-insulating mandrel has to be arranged between the hot extruded tube and the cable core, so that the cable core is not damaged by the tube as it comes out from the extrusion press.

A smooth cylindrical tube to form the cable sheath can also be produced by winding a metal strip around the cable with the edges of the strip abutting or overlapping. These edges are then welded to one another. Here again, the tube must have a greater internal diameter than the external diameter of the cable core, because in the production of the tube at least one spacing and insulating member must be arranged beneath the welding point, in order on the one hand to keep the welding heat away from the cable core and on the other hand to inhibit the formation of an edge in the weld.

In the methods hitherto employed for the corrugation of a smooth tube surrounding the cable core, the corrugating dies merely press the corrugations into the tube forming the sheath. Consequently the internal diameter of the smooth cylindrical tube must be very finely gaged, so that it is adapted to the greatest possible extent in each case to the diameter of the core to be sheathed. This renders it difficult to use these methods of sheathing cable cores in case of those cases where manufacturers purchase the smooth cylindrical tubes from a tube maker and must stock the tubes for sheathing their cables. It also renders difficult the use of these sheathing methods in those cases where cable manufacturers either press the tube directly on to the cable core or produce it from a metal strip during the sheathing operation. The depth of the corrugation or bellows is in fact dependent upon the desired flexibility of the sheathing cable. In general, the depth is less than the difference of radius between the smooth tube available and the cable core to be sheathed, for the range of smooth tubes kept in stock will usually differ by about 8 mm. in their internal diameters. Consequently, before corrugation, the tube must often be worked down by drawing or rolling to the correct initial diameter necessary for the sheathing operation, unless by chance the manufacturer possesses just the correct diameter, which will happen only in rare cases, in view of the multiplicity of different cable core diameters in demand. The reduction of the tube diameter requires a special operation, in which the material of the tube is unavoidably work-hardened. This hardening of the material can only be removed by a further operation, namely annealing to soften the metal again. This later operation however requires special equipment which increases the costs.

The invention has for its main object to avoid these complications and the difficulties occurring therewith in that the deforming die used for the profiling of the sheath is arranged in such a way that it reduces the tube diameter to the correct extent simultaneously with the production of the depressions of the tube profile.

According to the invention a die is provided having a helically arranged continuous land forming a deforming or working surface which extends inwardly into a through-bore of the die and effects helical depressions into the cable sheath and is provided with a spiral entry portion or circumvolution and with an adjoining cylindrical portion formed by circumvolutions of equal interval diameter. According to the invention, the working surface of the entry or starting end of the die has a helical form in reducing the diameter of the tube and working into the tube a helically corrugated profile and simultaneously work down the crests of the corrugations in forming the deformations. The crests standing during the operation are disposed between the opposite flanks of the helical working surface. The adjoining circumvolutions of the working surface extend an equal distance radially inwardly into the through-bore of the die to form the final corrugated profile. In this way, the diameter of the tube is reduced and the crest of the corrugations located between the opposite flanks of the deforming surface are worked down. Each crest during the operation is formed between the opposite flanks of the deforming surface circumvolutions but they never quite engage the die root surfaces between the convolutions of the working surface.

The circumvolutions of the helically arranged working surface are disposed relatively close together, consequently, the circumvolutions have a small clearance between each other and work down the crests intermediate of the corrugations by means of the helical portions of the working surface or land. According to the invention the entry circumvolution extends for a part of the inner circumference of the die and may have an entry part thereof more steeply inclined than the end of the circumvolution in order to gradually press down the sheath to form the corrugation depressions in the sheath. Furthermore, the entry circumvolution of the working surface may have a wider crest than the width of the cylindrical continuation circumvolutions of the continuous land and then tapers to the width of the continuation circumvolutions. It will be understood that the die according to the invention may make use of one or all features of the invention above described.

The invention is hereinafter more fully described with reference to the accompanying drawing which illustrates two embodiments of the die for the production of a bellows profile sheath; in these drawings:

FIG. 1 is a longitudinal section of a die, according to the invention, showing in elevation the tube thereby deformed;

FIG. 2 is an end view of the die in FIG. 1, showing its spiral entry portion and adjoining cylindrical guide or deforming portion;

FIG. 3 is a longitudinal section of another embodiment of a die, according to the invention, in which the spiral entry portion has a deforming surface which is wider at the entry than at the end.

Referring to FIGS. 1 and 2, the cable sheath 1 may be advanced longitudinally by any convenient means, not shown, while the die 3 is revolved around it, being driven for example by dogs engaging with its notched periphery. The sheath 1, as it becomes deformed to the helically corrugated profile 2 by being worked by the die 3, is reduced in diameter, as shown, at the same time that it receives the corrugated profile, because with the working in of the depressions or grooves, which lie relatively close together, the intermediate crests of the corrugations are also necessarily worked down to another reduced diameter.

The die 3 comprises a die body portion provided with a longitudinal through-bore. The die body has internal working surfaces for forming the corrugated profile on the cable sheath 1. The working surfaces in the die comprise a continuous helical land extending circumferentially and longitudinally in said through-bore comprising a plurality of continuous helical circumvolutions 5, 6 extending radially inwardly into the through-bore and having a variable helix pitch.

The land has flat crests and side surfaces substantially normal to the die roots or surfaces defining the outermost diameter of the through-bore. The circumvolutions are relatively closely spaced. The spacing distances between the helices or circumvolutions are less than the width of the land crests so that the die roots are relatively narrow between the land circumvolutions.

The die is provided with a leading circumvolution 5 forming a starting land helix adjacent one end of the through-bore corresponding to a starting end of the die. A terminal circumvolution 6 forms a terminal helix of the land at the opposite end of the die. The inclined entry zone or starting circumvolution 5 of the die has a short and steep starting portion 5', seen more clearly in FIG. 2 as extending for about half the circumference of the inner surfaces. In operation this helix gradually presses down the corrugation depressions on a corresponding spiral on the sheath. At the same time the corrugation crests are also pressed or worked down to a reduced diameter.

The deforming or working surface of the starting helix 5 of the die may be made wider at the beginning as indicated at 8 and narrower at the end as indicated at 7 and shown in FIG. 3. In this way, it will press the corrugation depression down by the wider starting portion thereof as well as the adjacent portion of the sheath for the corrugation crest. The final screw-thread portions or circumvolutions 6 of the die are provided with longitudinal indentations and form cylindrical continuation of the starting circumvolution and are made narrower for production of the desired profile for the corrugation crest in the finished sheath.

By way of further explanation, it may be assumed that a cable core of 43 mm. diameter is to be sheathed, and that the radial height of the sheath corrugations is to be 4 mm. Normally, for this purpose, a tube of 51 mm. diameter would be required. But it happens, by reasons of storage limitation, that only tubes of 50 mm. and 57.5 mm. diameter are available. The tube of 50 mm. would evidently allow only a maximum corrugation height of 3.5 mm. which is insufficient. The tube of 57.5 mm. diameter on the other hand would first have to be drawn down to 51 mm. diameter, before being corrugated. With the improved tool according to the present invention, however, the desired corrugation could be effected together with the reduction of diameter in one working operation.

Again, assume that an electric cable core of 10 mm. diameter is to be sheathed with a very thin aluminumalloy tube having a wall thickness of 0.25 mm., and that corrugations to give the cable the necessary flexibility must have a depth or radial height amounting to 1 mm. The cable core cannot be drawn into a tube or sheath of 12.5 mm. external diameter which would have only 2 mm. difference between the internal diameter of the sheath and the external diameter of the cable core. But, by using a die in accordance with the invention, it will become possible to use a tube with a greater internal diameter, which offers no difficulties to the drawing in of the cable core, the tube being reduced to 12.5 mm. external diameter at the same time that it is profiled.

What we claim is:

1. A die for the production of flexible, helically corrugated metal sheaths for electrical cables having corrugations forming crests and grooves peripherally on the sheath, comprising a tubular die body portion provided with a longitudinal through-bore, said die body portion having internal working surfaces for forming the corrugations on a cable sheath comprising, a land extending circumferentially and longitudinally in said through-bore formed as continuous, helical circumvolutions extending radially inwardly into the through-bore and having a preselected variable helix pitch, said land having a variable working depth and flat crests out of concentric alignment, said circumvolutions comprising a leading circumvolution forming a starting land helix adjacent one end of the through-bore corresponding to a starting end of the die, and a terminal circumvolution forming a terminal helix, said starting land helix having a lesser working depth than successive land helices, and said die body portion having substantially narrow die roots between successive land helices and each of substantially less width than the width of the individual land helices.

2. A die for the production of flexible, helically corrugated metal sheaths for electrical cables having corrugations forming crests and grooves peripherally on the sheath, comprising a tubular die body portion provided with a longitudinal through-bore, said die body portion having internal working surfaces for forming the corrugations on a cable sheath comprising, a land extending circumferentially and longitudinally in said through-bore formed as continuous, helical circumvolutions extending inwardly into the through-bore and having a preselected variable helix pitch, said land having a variable working depth and flat crests out of concentric alignment, said circumvolutions comprising a leading partial circumvolution forming a starting land helix adjacent one end of the through-bore corresponding to a starting end of the die, and a terminal circumvolution forming a terminal helix, said starting land helix having a lesser working depth than successive land helices and having a wider crest, said die body portion having substantially narrow die roots between successive land helices, and said land having opposite side faces forming a leading and a trailing flank of respective helices of the land extending radially inwardly substantially normal to the respective adjacent die roots.

3. A die for the production of flexible, helically corrugated metal sheaths for electrical cables having corrugations forming crests and grooves peripherally on the sheath, comprising a tubular die body portion provided with a longitudinal through-bore, said die body portion having internal working surfaces for forming the corrugations on a cable sheath comprising, a land extending circumferentially and longitudinally in said through-bore formed as continuous, helical circumvolutions extending inwardly into the through-bore and having a preselected variable helix pitch, said land having a variable working depth and flat crests out of concentric alignment, said circumvolutions comprising a leading circumvolution forming a starting land helix adjacent one end of the through-bore corresponding to a starting end of the die, and a terminal circumvolution forming a terminal helix, said starting land helix having a lesser working depth than successive land helices and having a wider crest, said die body portion having substantially narrow die roots between successive land helices and each of substantially less width than the width of the individual land helices, said land having opposite side faces forming a leading and a trailing flank of respective helices of the land extending radially inwardly substantially normal to the respective adjacent die roots, and said circumvolutions comprising one helix of the land intermediate the starting and terminal helix having the same working depth as said terminal helix.

References Cited in the file of this patent

UNITED STATES PATENTS

| 2,680,975 | Goldsmith | June 15, 1954 |
| 2,751,077 | Latin et al. | June 19, 1956 |
| 2,869,220 | Raydt et al. | Jan. 20, 1959 |

FOREIGN PATENTS

| 250,425 | Switzerland | June 16, 1940 |
| 492,006 | Canada | Apr. 14, 1953 |